(12) United States Patent
Shigemitsu et al.

(10) Patent No.: US 8,422,139 B2
(45) Date of Patent: Apr. 16, 2013

(54) IMAGING LENS AND IMAGING MODULE

(75) Inventors: Norimichi Shigemitsu, Osaka (JP); Hiroyuki Hanato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 168 days.

(21) Appl. No.: 13/029,612

(22) Filed: Feb. 17, 2011

(65) Prior Publication Data

US 2011/0205639 A1 Aug. 25, 2011

(30) Foreign Application Priority Data

Feb. 23, 2010 (JP) ................................ 2010-037689

(51) Int. Cl.
*G02B 9/00* (2006.01)
*G02B 11/00* (2006.01)
(52) U.S. Cl.
USPC .......................................... 359/642; 359/718
(58) Field of Classification Search .................. 359/642, 359/718
See application file for complete search history.

(56) References Cited

U.S. PATENT DOCUMENTS

| | | | | |
|---|---|---|---|---|
| 5,745,297 A | * | 4/1998 | Kaneko et al. | 359/651 |
| 6,144,499 A | * | 11/2000 | Yokota et al. | 359/649 |
| 7,365,916 B2 | * | 4/2008 | Sato et al. | 359/718 |
| 2001/0003494 A1 | | 6/2001 | Kitagawa | |
| 2005/0270665 A1 | | 12/2005 | Do | |
| 2006/0092528 A1 | * | 5/2006 | Arai | 359/771 |
| 2006/0279855 A1 | * | 12/2006 | Sun | 359/784 |
| 2007/0058256 A1 | * | 3/2007 | Sun | 359/569 |
| 2012/0075725 A1 | * | 3/2012 | Huddleston et al. | 359/718 |

FOREIGN PATENT DOCUMENTS

| | | |
|---|---|---|
| JP | 64-37517 A | 2/1989 |
| JP | 2000-287109 | * 10/2000 |
| JP | 2001-221904 A | 8/2001 |
| JP | 2003-131124 A | 5/2003 |
| JP | 2005-345713 | 12/2005 |

* cited by examiner

*Primary Examiner* — Jordan Schwartz
(74) *Attorney, Agent, or Firm* — Nixon & Vanderhye P.C.

(57) ABSTRACT

In order to attain an imaging lens whose resolution performance is totally excellent, the imaging lens is in a shape of rotation symmetry in an optical effective aperture, and an image height-MTF property of the imaging lens is designed such that a maximum MTF value of a peripheral region where the image height is greater than zero is greater than an MTF value of a center region where the image height is zero in at least one of a sagittal direction and a tangential direction. This makes it possible to totally maintain an excellent resolution performance of a product even in a case where the performance of the product becomes unstable due to a tolerance that occurs at the time of manufacturing the product.

12 Claims, 3 Drawing Sheets

| IMAGE HEIGHT | MTF | |
|---|---|---|
| | DESIGNED VALUE | PRODUCT |
| 0.0 | 0.500 | 0.500 |
| 0.1 | 0.505 | 0.485 |
| 0.2 | 0.520 | 0.480 |
| 0.3 | 0.550 | 0.490 |
| 0.4 | 0.575 | 0.495 |
| 0.5 | 0.580 | 0.480 |
| 0.6 | 0.560 | 0.440 |
| 0.7 | 0.510 | 0.370 |
| 0.8 | 0.440 | 0.280 |
| 0.9 | 0.370 | 0.190 |
| 1.0 | 0.300 | 0.100 |

| IMAGE HEIGHT | MTF | |
| --- | --- | --- |
| | DESIGNED VALUE | PRODUCT |
| 0.0 | 0.500 | 0.500 |
| 0.1 | 0.505 | 0.485 |
| 0.2 | 0.520 | 0.480 |
| 0.3 | 0.550 | 0.490 |
| 0.4 | 0.575 | 0.495 |
| 0.5 | 0.580 | 0.480 |
| 0.6 | 0.560 | 0.440 |
| 0.7 | 0.510 | 0.370 |
| 0.8 | 0.440 | 0.280 |
| 0.9 | 0.370 | 0.190 |
| 1.0 | 0.300 | 0.100 |

| IMAGE HEIGHT | MTF | |
| --- | --- | --- |
| | DESIGNED VALUE | PRODUCT |
| 0.0 | 0.550 | 0.550 |
| 0.1 | 0.526 | 0.506 |
| 0.2 | 0.500 | 0.460 |
| 0.3 | 0.473 | 0.413 |
| 0.4 | 0.444 | 0.364 |
| 0.5 | 0.414 | 0.314 |
| 0.6 | 0.381 | 0.261 |
| 0.7 | 0.345 | 0.205 |
| 0.8 | 0.304 | 0.144 |
| 0.9 | 0.257 | 0.077 |
| 1.0 | 0.200 | 0.000 |

IMAGING LENS AND IMAGING MODULE

This Nonprovisional application claims priority under 35 U.S.C. §119(a) on Patent Application No. 2010-037689 filed in Japan on Feb. 23, 2010, the entire contents of which are hereby incorporated by reference.

TECHNICAL FIELD

The technology presented herein relates to an imaging lens and an imaging module that are incorporated in a digital camera or the like of a mobile terminal.

BACKGROUND AND SUMMARY

Conventionally, there have been developed various compact digital cameras and digital video units that incorporate an imaging module including an imaging lens and a solid-state image capturing element. Generally, the imaging lens that is in a shape of rotation symmetry in an optical effective aperture is designed such that an MTF value is greatest in a center region where an image height is zero (see, for example, Patent Literature 1).

FIG. 4 is a graph showing an image height-MTF property of a conventional imaging lens. As shown in a full line of FIG. 4, the conventional imaging lens is designed such that the MTF value of the conventional imaging lens is greatest in the center region where the image height is zero and increase in the image height causes deterioration in the MTF value. This makes it possible to attain an imaging lens whose resolution performance is excellent in the center region.

Citation List

Patent Literature
Patent Literature 1
Japanese Patent Application Publication Tokukai No. 2005-345713 A (Publication Date: Dec. 15, 2005)

Generally, resolution performance of an actual imaging lens product is deteriorated in a peripheral region of the lens which peripheral region is more distant from a center region of the lens, due to lens eccentricity that occurs at the time of manufacturing the product. A dashed line in the graph of FIG. 4 shows an MTF value to an image height of the actual product in a case where an actual MTF value of the actual product deteriorates by (image height of designed value)×0.2. The actual MTF value is greatest (0.55) in the center region, and remarkably deteriorates than that of the designed value in the peripheral region. As described above, the resolution performance of the imaging lens product greatly deteriorates in the peripheral region.

Recently, an information mobile terminal, and a mobile terminal such as a mobile phone have remarkably come into wide use. There has been required reduction in cost of a camera module incorporated in the mobile phone that comes into wide use in newly emerging countries and an imaging module incorporated in a sub-camera of the mobile terminal, the reduction in cost being attained by simple configurations and process technologies of the camera module and the imaging module. To satisfy the requirement, it is necessary to reduce the number of lens of the conventional camera module and imaging module.

However, in a case where the number of lens is reduced, it is impossible to adequately correct for aberration. Further, as described above, the resolution performance of the imaging lens product deteriorates greatly in the peripheral region. This makes it difficult to provide a sufficient tolerance in manufacturing the imaging lens product.

The present technology is made in view of the above problem, and a feature of the present technology is to provide an imaging lens whose resolution performance is totally excellent.

In order to attain the above feature, an imaging lens of the present technology, being in a shape of rotation symmetry in an optical effective aperture, wherein: an image height-MTF property is designed such that, in at least one of a sagittal direction and a tangential direction, a maximum MTF value of a peripheral region where the image height is greater than zero is greater than an MTF value of a center region where the image height is zero.

According to the above arrangement, the maximum MTF value of the peripheral region is designed so as to be greater than the MTF value of the center region. The MTF value is further deteriorated in the peripheral region than in the center region, due to lens eccentricity that occurs at the time of manufacturing a product. It is therefore possible to suppress the MTF value of an actual product of the present embodiment to be deteriorated due to increase in the image height of the actual product, compared to a conventionally designed product in which the MTF value is greatest in the center region. That is, according to the above arrangement, it is possible to totally maintain an excellent resolution performance of the product even in a case where the performance of the product becomes unstable due to a tolerance that occurs at the time of manufacturing the product. This makes it possible to provide an imaging lens whose resolution performance is totally excellent.

As described above, an imaging lens of the present technology, being in a shape of rotation symmetry in an optical effective aperture, wherein: an image height-MTF property is designed such that, in at least one of a sagittal direction and a tangential direction, a maximum MTF value of a peripheral region where the image height is greater than zero is greater than an MTF value of a center region where the image height is zero. This makes it possible to provide an imaging lens whose resolution performance is totally excellent.

DESCRIPTION OF EMBODIMENTS

Figure 1:
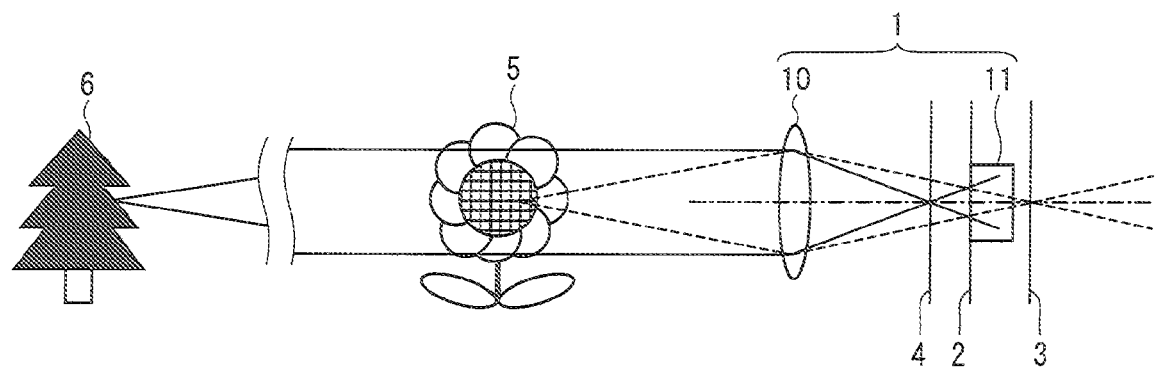
FIG. 1 is a view schematically showing an arrangement of an imaging module in accordance with an embodiment
Figure 2:
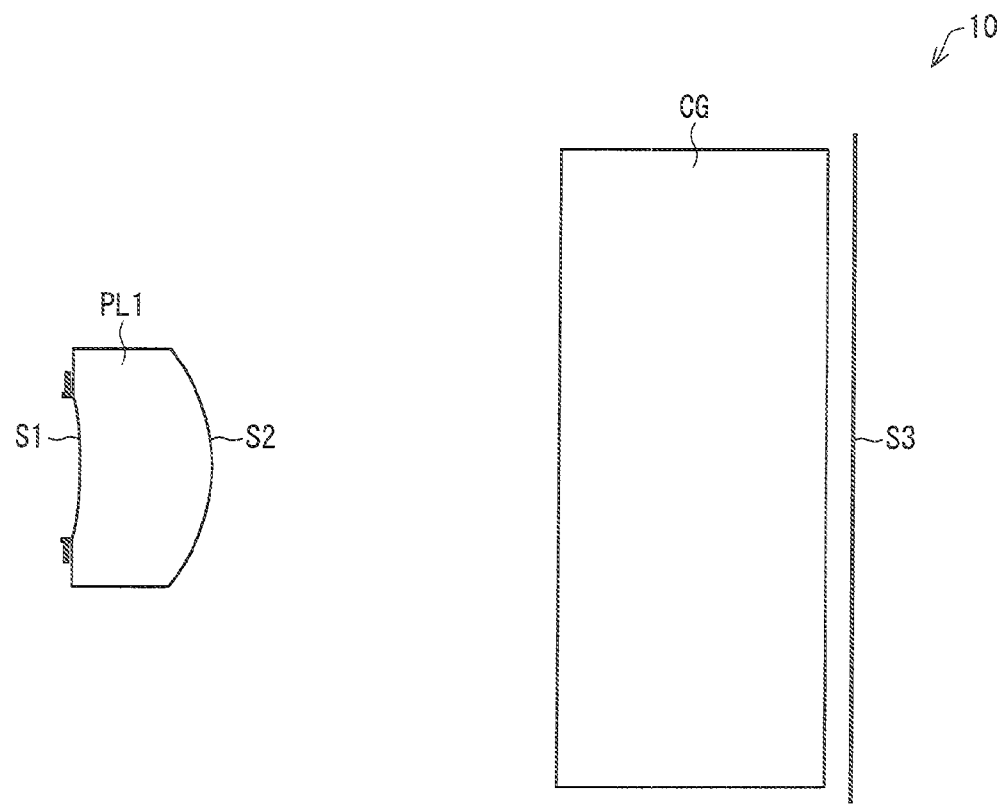
FIG. 2 is a cross-sectional view showing an example of a concrete arrangement of an imaging lens of the imaging module shown in FIG. 1.
Figure 3:
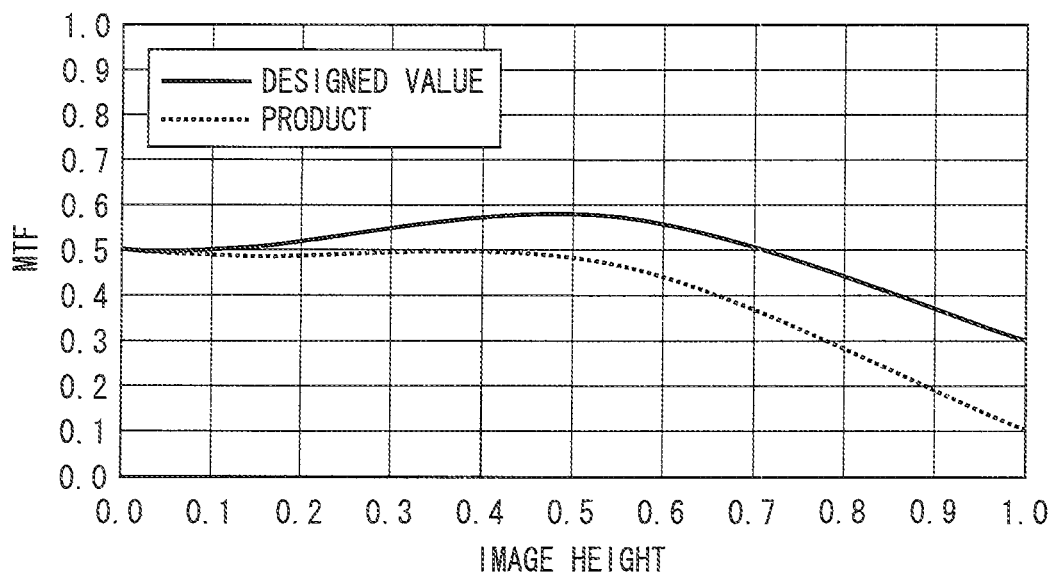
FIG. 3 is a graph showing an image height-MTF property of the imaging lens.

The following describes an embodiment of the present technology with reference to FIGS. 1 through 3.

(Arrangement of Imaging Module)

FIG. 1 is a view schematically showing an arrangement of an imaging module (camera module or lens module) of the present embodiment. The imaging module 1 includes an imaging lens 10 and a sensor (image capturing element) 11.

The imaging lens 10 forms, on an image surface, an image of an object to be captured by the imaging module 1. The sensor 11 is an image capturing element which converts light imaged by the imaging lens 10 into an electric signal and which then outputs the electric signal thereby allowing the object to be displayed in a display device (not shown). Examples of the sensor 11 encompass solid-state image capturing elements such as a CCD (Charge Coupled Device) and a CMOS (Complementary Metal Oxide Semiconductor). A sensor position 2 where the sensor 11 is provided ranges from a best image surface position 3 where the imaging lens 10 images white light from an object 5 that is at close range to the imaging module 1 to a best image surface position 4 where the imaging lens 10 images white light from an object 6 that is at infinite distance from the imaging module 1. The best image surface position is a position of the image surface in which position an image having a greatest degree of concentration of light or a greatest resolution is formed. A relative position of the imaging lens 10 and the sensor 11 is adjusted by a focus adjustment mechanism (not shown).

(Arrangement of Imaging Lens)

FIG. 2 is a cross-sectional view showing an example of a concrete arrangement of the imaging lens 10. The imaging lens 10 includes a lens PL1 and a cover glass CG. A surface of the lens PL1 which surface faces an object to be imaged (object facing surface) is S1, and a surface of the lens PL1 which surface faces an image surface of the imaging lens 10 (image surface facing surface) is S2. The image surface of the imaging lens 10 is S3, and corresponds to the sensor position 2 (see FIG. 1).

The above-arranged imaging lens 10 is an imaging lens that is in a shape of rotation symmetry in an optical effective aperture, and designed to have the following image height-MTF property. That is, the imaging lens 10 is designed to have the image height-MTF property such that a maximum MTF value of a region where the image height ranges from 0.2 to 0.7 is 0.05 or more greater than an MTF value of a center region where the image height is zero.

(Image Height-MTF Property of Imaging Lens)

FIG. 3 is a graph showing an image height-MTF property of the imaging lens 10 of the present embodiment. A full line of FIG. 3 indicates a designed value of the MFT to the image height. The maximum MTF value (0.58) of the region where the image height ranges from 0.2 to 0.7 is 0.05 or more greater than the MTF value (0.50) of the center region.

Figure 4:
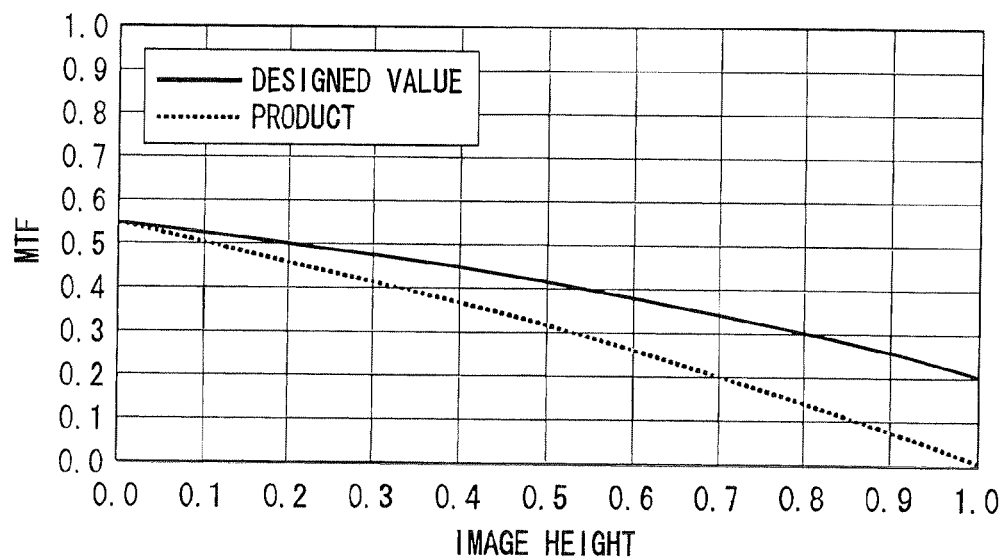
FIG. 4 is a graph showing an image height-MTF property of a conventional imaging lens.

Meanwhile, a dashed line of FIG. 3 shows an MTF value to an image height of an actual product in a case where an actual MTF value of the actual product is deteriorated by (the image height of the designed value)×0.2 due to lens eccentricity that occurs at the time of manufacturing the product. In a case where the dashed line of FIG. 3 is compared to that of FIG. 4, a conventional arrangement is superior to the present embodiment in terms of resolution performance of the center region. Meanwhile, as shown in FIG. 3, the resolution performance of a peripheral region of the present embodiment is substantially equal to that of the center region of the present embodiment in a region where the image height is 0.5 or less, and the resolution performance of the present embodiment is excellent in a region where the image height is substantially 0.7 or less.

Particularly, the region where the image height ranges from 0.2 to 0.7 is an important region that affects an appearance of an image. It is therefore preferable to design the MTF value of the region where the image height ranges from 0.2 to 0.7 to be greater than the MTF value of the center region. Such design causes the resolution performance of the center region of the present embodiment to deteriorate slightly than that of the center region of the conventional arrangement. However, the MTF value of the center region is hardly deteriorated by the lens eccentricity that occurs at the time of manufacturing the product. This makes it possible to attain an imaging lens whose resolution performance balance is excellent over an entire image.

As described above, the imaging lens is designed in consideration of a peripheral balance such that the maximum MTF value of the peripheral region is greater than the MTF value of the center region. This makes it possible to manufacture a product having an excellent center value of performance distribution of the product even in a case where the performance of the product becomes unstable due to a tolerance that occurs at the time of manufacturing the product.

The imaging lens having such an image height-MTF property is attained by focus adjustment that employs curvature of field. The curvature of field is aberration of a lens having a property in which an image of a planar object is formed on a curved surface of the lens rather than on a planar surface of the lens. According to the imaging lens 10 of the present embodiment, a relative position of the lens PL1 and the image surface S3 is adjusted such that the imaging lens 10 of the present embodiment is focused on a periphery of an image.

Specifically, in a case where the imaging lens 10 has an image surface that is concavely curved toward the sensor 11, the focus adjustment mechanism adjusts the relative position of the imaging lens 10 and the sensor 11 such that the image surface of the imaging lens 10 is positioned between an object to be captured and the best image surface position of the center region of the imaging lens 10. Meanwhile, in a case where the imaging lens 10 has an image surface that is convexly curved toward the sensor 11, the focus adjustment mechanism adjusts the relative position of the imaging lens 10 and the sensor 11 such that the image surface of the imaging lens 10 is positioned beyond the object to be captured, compared with the best image surface position of the center region of the imaging lens 10.

(Modified Example)

The image height-MTF property shown in FIG. 3 may be attained as follows. The object facing surface S1 or the image surface facing surface S2 of the lens PL1 is made aspheric while the image surface of the lens PL1 is less curved, instead of the focus adjustment that employs the curvature of field.

Further, the imaging module 1 shown in FIG. 1 may have no focus adjustment mechanism (focus adjustment process) that adjusts the relative position of the imaging lens 10 and the sensor 11. This makes it possible to simply manufacture the imaging module 1. It is accordingly possible to provide a product which is low in cost and which has an excellent performance.

The imaging lens of the present embodiment is made up of one lens. Meanwhile, the imaging lens of the present embodiment may be made up of 2 through 4 lenses. In this case, a cheap lens incapable of adequately correcting for aberration can be used as a lens that constitutes the imaging lens 10.

A spatial frequency region where the MTF value of the center region is 0.4 or less possibly includes a region that does not affect the resolution performance of the imaging module. Therefore, the imaging lens 10 of the present embodiment may be designed so as to have the image height-MTF property shown in FIG. 3 in the spatial frequency region where the MTF value of the center region is 0.4 or greater. Further, the imaging lens 10 is preferably designed so as to have the image height-MTF property shown in FIG. 3 in both a sagittal direction and a tangential direction. However, the imaging lens 10 may be designed so as to have the image height-MTF property in either of the sagittal direction and the tangential direction.

The imaging lens 10 of the present embodiment is designed such that the maximum MTF value of the region where the image height ranges from 0.2 to 0.7 is 0.05 or more greater than the MTF value of the center region where the image height is zero. However, this is not the only option as long as the image height-MTF property is designed such that the maximum MTF value of the peripheral region is greater than the MTF value of the center region. This design also makes it possible to attain an imaging lens whose resolution performance is totally more excellent than that of the conventionally arranged imaging lens.

The present technology is not limited to the description of the embodiments above, but may be altered by a skilled person within the scope of the claims. An embodiment based on a proper combination of technical means disclosed in different embodiments is encompassed in the technical scope of the present technology.

It is preferable to arrange the imaging lens of the present technology such that the image height-MTF property is designed such that, in a spatial frequency region where the MTF value of the center region is 0.4 or greater, the maximum MTF value of the peripheral region where the image height is greater than zero is greater than the MTF value of the center region where the image height is zero in the at least one of the sagittal direction and the tangential direction.

The spatial frequency region where the MTF value of the center region is 0.4 or less possibly includes a region that does not affect the resolution performance of the imaging module. Therefore, such arrangement less affects an image quality. This makes it possible to design the image height-MTF property of the imaging lens more easily.

It is preferable to arrange the imaging lens of the present technology such that the maximum MTF value of a region where the image height ranges from 0.2 to 0.7 is designed to be greater than the MTF value of the center region by 0.05 or more.

The region where the image height ranges from 0.2 to 0.7 is an important region that affects an appearance of an image. Therefore, the above arrangement allows balance of the resolution performance to be more excellent.

It is preferable to arrange the imaging lens of the present technology such that the image height-MTF property is designed such that, in both the sagittal direction and the tangential direction, the maximum MTF value of the peripheral region where the image height is greater than zero is greater than the MTF value of the center region where the image height is zero.

The above arrangement allows the balance of the resolution performance to be totally yet more excellent.

It is preferable that the imaging lens of the present technology has an aspheric surface.

According to the above arrangement, it is possible to easily attain the image height-MTF property by an aspheric coefficient.

It is preferable that the imaging lens of the present invention technology includes 1 through 4 lenses.

According to the above arrangement, it is possible to use a cheap lens incapable of adequately correcting for aberration as a lens that constitutes the imaging lens.

An imaging module of the present technology includes: the imaging lens; and an image capturing element which receives light of an image formed by the imaging lens and which performs photoelectric conversion of the light, and the imaging module includes no focus adjustment mechanism that adjusts a relative position of the imaging lens and the image capturing element.

According to the above arrangement, it is possible to easily manufacture the imaging module. This makes it possible to provide a product which is low in cost and which has an excellent performance.

An imaging module of the present technology includes: the imaging lens; an image capturing element which receives light of an image formed by the imaging lens and which performs photoelectric conversion of the light; and a focus adjustment mechanism that adjusts a relative position of the imaging lens and the image capturing element, the imaging lens having an image surface that is concavely curved toward the image capturing element, the focus adjustment mechanism adjusting the relative position such that the image surface of the imaging lens is positioned between an object to be captured and a best image surface position of the center region.

An imaging module of the present technology includes: the imaging lens; an image capturing element which receives light of an image formed by the imaging lens and which performs photoelectric conversion of the light; and a focus adjustment mechanism that adjusts a relative position of the imaging lens and the image capturing element, the imaging lens having an image surface that is convexly curved toward the image capturing element, the focus adjustment mechanism adjusting the relative position such that the image surface of the imaging lens is positioned beyond an object to be captured, compared with a best image surface position of the center region.

According to the above arrangement, the image surface of the imaging lens is shifted from the best image surface position of the center region. This makes it possible to adjust such that the imaging lens is focused on the peripheral region than on the center region. In this manner, it is possible to easily attain the imaging lens having the image height-MTF property by the focus adjustment that employs the curvature of field.

The technology presented herein is suitably applicable to compact imaging devices such as a digital camera and a digital video unit that are incorporated in a mobile terminal.

Reference Signs List

1: imaging module
2: sensor position
3: best image surface position
4: best image surface position
5: object to be captured
6: object to be captured
10: imaging lens
11: sensor (image capturing element)
CG: cover glass
PL1: lens
S1: object facing surface
S2: image surface facing surface
S3: image surface

The invention claimed is:
1. An imaging module, comprising:
an imaging lens;
an image capturing element which receives light of an image formed by the imaging lens and which performs photoelectric conversion of the light; and
a focus adjustment mechanism that adjusts a relative position of the imaging lens and the image capturing element,
the imaging lens being in a shape of rotation symmetry in an optical effective aperture, wherein: a center region of the image has an image height of zero, a peripheral region of the image has an image height greater than zero, an image height-MTF property is designed such that, in at least one of a sagittal direction and a tangential direction, a maximum MTF value of a peripheral region where the image height is greater than zero is greater than an MTF value of a center region where the image height is zero, the imaging lens having an image surface that is concavely curved toward the image capturing element, the focus adjustment mechanism adjusting the relative position such that during image capturing the image surface of the imaging lens is positioned between an object to be captured and a best image surface position of the center region.

2. An imaging module, comprising:

an imaging lens;

an image capturing element which receives light of an image formed by the imaging lens and which performs photoelectric conversion of the light; and a focus adjustment mechanism that adjusts a relative position of the imaging lens and the image capturing element, the imaging lens being in a shape of rotation symmetry in an optical effective aperture, wherein: a center region of the image has an image height of zero, a peripheral region of the image has an image height greater than zero, an image height-MTF property is designed such that, in at least one of a sagittal direction and a tangential direction, a maximum MTF value of a peripheral region where the image height is greater than zero is greater than an MTF value of a center region where the image height is zero, the imaging lens having an image surface that is convexly curved toward the image capturing element, the focus adjustment mechanism adjusting the relative position such that during image capturing the image surface of the imaging lens is positioned beyond an object to be captured in a direction towards the image capture element, compared with a best image surface position of the center region.

3. The imaging module as set forth in claim 1, wherein:

the image height-MTF property is designed such that, the MTF value of the center region is 0.4 or greater, and in a spatial frequency region, the maximum MTF value of the peripheral region where the image height is greater than zero is greater than the MTF value of the center region where the image height is zero in the at least one of the sagittal direction and the tangential direction.

4. The imaging module as set forth in claim 3, wherein:

the maximum MTF value of a region where the image height ranges from 0.2 to 0.7 is designed to be greater than the MTF value of the center region by 0.05 or more.

5. The imaging module as set forth in claim 1, wherein:

the image height-MTF property is designed such that, in both the sagittal direction and the tangential direction, the maximum MTF value of the peripheral region where the image height is greater than zero is greater than the MTF value of the center region where the image height is zero.

6. The imaging module as set forth in claim 1, having an aspheric surface.

7. The imaging module as set forth in claim 1, consisting of 1 through 4 lenses.

8. The imaging module as set forth in claim 2, wherein:

the image height-MTF property is designed such that, the MTF value of the center region is 0.4 or greater, and in a spatial frequency region, the maximum MTF value of the peripheral region where the image height is greater than zero is greater than the MTF value of the center region where the image height is zero in the at least one of the sagittal direction and the tangential direction.

9. The imaging module as set forth in claim 8, wherein:

the maximum MTF value of a region where the image height ranges from 0.2 to 0.7 is designed to be greater than the MTF value of the center region by 0.05 or more.

10. The imaging module as set forth in claim 2, wherein:

the image height-MTF property is designed such that, in both the sagittal direction and the tangential direction, the maximum MTF value of the peripheral region where the image height is greater than zero is greater than the MTF value of the center region where the image height is zero.

11. The imaging module as set forth in claim 2, having an aspheric surface.

12. The imaging module as set forth in claim 2, consisting of 1 through 4 lenses.

* * * * *